United States Patent
Robinson

(10) Patent No.: US 7,221,720 B2
(45) Date of Patent: May 22, 2007

(54) DECODERS FOR MANY-CARRIER SIGNALS, IN PARTICULAR IN DVB-T RECEIVERS

(75) Inventor: Adrian Paul Robinson, Surrey (GB)

(73) Assignee: British Brodcasting Corporation, London (GB)

( * ) Notice: Subject to any disclaimer, the term of this patent is extended or adjusted under 35 U.S.C. 154(b) by 639 days.

(21) Appl. No.: 10/137,657

(22) Filed: May 2, 2002

(65) Prior Publication Data

US 2002/0186797 A1  Dec. 12, 2002

(30) Foreign Application Priority Data

May 3, 2001 (GB) ................................ 0110907.3

(51) Int. Cl.
*H03D 1/00* (2006.01)
*G06F 3/00* (2006.01)
(52) U.S. Cl. .................. 375/341; 375/340; 714/786
(58) Field of Classification Search ................ 375/341, 375/340; 714/786
See application file for complete search history.

(56) References Cited

U.S. PATENT DOCUMENTS

| 5,134,635 | A | 7/1992 | Hong et al. |
| 5,636,253 | A | 6/1997 | Spruyt |
| 5,687,164 | A | 11/1997 | Takahashi et al. |
| 6,487,694 | B1 * | 11/2002 | Bajwa .................. 714/786 |
| 2004/0071229 | A1 * | 4/2004 | Collins .................. 375/340 |

FOREIGN PATENT DOCUMENTS

| EP | 0 677 937 A1 | 10/1995 |
| EP | 0 827 298 A2 | 3/1998 |
| EP | 0 827 298 A3 | 3/1998 |
| EP | 0 827 299 A2 | 3/1998 |
| EP | 0 827 299 A3 | 3/1998 |
| EP | 0 827 300 A2 | 3/1998 |
| EP | 0 827 300 A3 | 3/1998 |
| EP | 0 844 741 A2 | 5/1998 |
| EP | 0 991 239 A2 | 4/2000 |
| GB | 2 342 546 A | 4/2000 |
| GB | 2 346 520 A | 8/2000 |

(Continued)

OTHER PUBLICATIONS

Lau, Channel Capacity and Error Exponents of Variable Rate Adaptive Channel Coding for Rayleigh Fading Channels, IEEE Transactions on Communications, vol. 47, No. 9, Sep. 1999, pp. 1345-1356.*

(Continued)

*Primary Examiner*—Mohammed Ghayour
*Assistant Examiner*—Cicely Ware
(74) *Attorney, Agent, or Firm*—Flynn, Thiel, Boutell & Tanis, P.C.

(57) ABSTRACT

A DVB-T receiver includes a channel equalizer, a metric assignment and demapping circuit, a Viterbi decoder and an outer Reed-Solomon decoder. The metric assignment and demapping circuit includes a soft-decision quantising arrangement which provides confidence values for the Viterbi decoder. The quantising arrangement receives a control input from channel state indication (CSI) measurement circuitry.

A further channel state indication is obtained on a symbol-by-symbol basis. This is compared an average obtained over a few symbols, to detect impulsive interference, and applied as part of the control for the soft-decision quantiser.

A signal derived from the further channel state indication is also applied to the erasures input of the Reed-Solomon decoder.

44 Claims, 7 Drawing Sheets

FOREIGN PATENT DOCUMENTS

| GB | 2 355 164 A | 4/2001 |
|---|---|---|
| WO | WO 92/22162 | 12/1992 |
| WO | WO 97/13378 | 4/1997 |
| WO | WO 98/58496 | 12/1998 |
| WO | WO 01/08365 A1 | 2/2001 |
| WO | WO 01/48927 A1 | 7/2001 |

OTHER PUBLICATIONS

Park et al., A Demapping Method using the Pilots in COFDM System, IEEE Transactions on Consumer Electronics, vol. 44, No. 3, Aug. 1998, pp. 1150-1153.*

Lee et al., Performance Analysis of Viterbi Decoder using Channel State Information of COFDM System, IEEE Transactions of Broadcasting, vol. 44, No. 4, Dec. 1998, pp. 488-496.* van Houtum, Wim J., "*Single Carrier Digital Terrestrial Television Broadcasting*", IEEE Transactions on Broadcasting, vol. 43, No. 4, Dec. 1997, pp. 403-411.

British Patent Office Search Report for GB 02100612.2 dated Jul. 2003, 2 pages.

Scott, J.H., *The How and Why of COFDM*, EBU Technical Review—Winter 1998, pp. 43-50.

"*Digital Video Broadcasting (DVB) ; Framing Structure, Channel coding and Modulation for Digital Terrestrial Television—ETSI EN 300 744*", Jan. 2001, pp. 1-49.

Weon-Cheol, Lee, et al, "*Viterbi Decoding Method Using Channel State Information in COFDM System*", International Conference of Consumer Electronics. 1999 Digest of Technical Papers, Jun. 1999, New York, NY, pp. 66-67.

Zogakis T. N., et al; "*Impulse Noise Mitigation Strategies for Multicarrier Modulation*", Proceedings of the International Conference on Communications (ICC), Geneva, May 23-26, 1993, IEEE, New York, USA, vol. 2, May 23, 1993, pp. 784-788.

* cited by examiner

DECODERS FOR MANY-CARRIER SIGNALS, IN PARTICULAR IN DVB-T RECEIVERS

BACKGROUND OF THE INVENTION

This invention relates to improvements in decoders for many-carrier signals, in particular in DVB-T receivers.

The invention is described in the context of the reception of so-called DVB-T signals, that is signals in accordance with the Digital Video Broadcasting standard for Terrestrial television, as defined in European Telecommunication Standard ETS 300 744. The invention in its various aspects is not however necessarily limited to use with such signals, but may be usable with other coded many-carrier transmission systems, particularly though not exclusively those using orthogonal frequency-division multiplexing (OFDM).

The DVB-T standard specifies the use of two types of interleaving in the forward error corrector in the transmitter. These comprise an outer convolutional interleaver and an inner interleaver. The effect of these interleavers is to spread the data in time, so that a short error burst does not affect bits which are adjacent in the original signal, but rather affects bits which are spread out over a period of time. This reduces the instantaneous error rate to a level where the errors can be corrected by the error correction circuitry in the receiver.

This works well for most types of transmission error. However, we have found that it can fail when there is impulsive interference with bursts of interference which have a duration of greater than, say, 10 µs. What happens then is that the interleaving spreads the errors in time but the error rate is still too high for the error correction circuitry, and thus the errors persist for a longer duration than they would have done if there was no interleaving at all.

With a many-carrier system such as coded OFDM (COFDM), the interference is spread over many samples by the time domain/frequency domain transformation effected e.g. by a fast Fourier transform (FFT) circuit. The adverse effect just described is therefore more likely to arise than with a conventional single-carrier system.

The present invention is directed to various ways in which this adverse effect of impulsive interference can be ameliorated.

It would be possible to achieve some improvement by increasing the depth of the outer interleaving, so that instead of being spread over 12–15 packets the errors were spread over say 105 packets, A larger memory is now required for the outer deinterleaver in the receiver and the system could still fail unless the interval between bursts of impulses were fairly long.

Another possibility would be to increase the redundancy in the Reed-Solomon code in the outer coder of the DVB-T standard. Increasing the redundancy will, however, correspondingly decrease the data capacity, and would upset the convenient numerical relationship adopted in the standard which leads to a whole number of packets in a super-frame.

Reference may be made to U.S. Pat. No. 5,687,164 and European Patent Applications EP-A-0 827 298, 0 827 299, and 0 827 300 which describe the use of a Viterbi decoder to decode a QAM signal. International Patent Application WO97/13378 describes obtaining channel state information from QPSK modulated symbols. U.S. Pat. No. 5,636,253 describes selecting for each symbol the nearest of the QAM points and calculating the difference from it, and multiplying it with a weighting coefficient. International Patent Application WO92/22162 describes a QAM system in which the constellation is modified in accordance with channel quality. U.S. Pat. No. 5,134,635 describes a convolutional decoder which assigns bit metrics to at least one bit of a symbol, and uses soft-decision Viterbi decoding with channel state information.

SUMMARY OF THE INVENTION

The present invention relates to a number of features which can be used in decoders for many-carrier signals, particularly OFDM, such as is used in the DVB-T system. The various features of the invention are defined in the independent claims below to which reference may now be made. Advantageous features are set forth in the appendant claims.

A preferred embodiment incorporating these features in the form of a number of improvements is described in more detail below with reference to the drawings. These improvements include the following:

(1) In a receiver for a many-carrier signal, a channel state indication is obtained by averaging over one symbol. This can then be compared with an average over a few symbols, so as to detect impulsive interference and other short-duration impairments. The indication of impulsive interference can then be employed in relation to the soft decisions fed to a Viterbi decoder. Preferably, however, the channel state indication is averaged over each one-quarter or one-sixteenth or similar proportion of a symbol (rather than a full symbol period) and is compared with the corresponding averages over a few symbols. This provides substantial savings in memory requirements.

(2) In a receiver for a many-carrier signal, the receiver comprising a Viterbi decoder followed by a Reed-Solomon decoder, erasures information from the Viterbi decoder is used in the Reed-Solomon decoder, making use of its errors and erasures decoding features. This increases the number of errors that can be corrected, without requiring a change to the Standard specifying the DVB-T signal.

(3) In accordance with another feature of the invention, a control output is provided from a Viterbi decoder which is dependent upon the error rate over a small number of bytes. This can in particular be used in combination with the feature in the preceding paragraph (2).

(4) It has been proposed to use information about channel quality to provide erasures signalling to a Reed-Solomon decoder. In accordance with yet another feature of this invention it is proposed to detect the many-carrier or OFDM symbols which have been affected by an impairment that lasts for only a short time, of the order of a symbol or less, and to apply this signal to the erasures signal input of a Reed-Solomon decoder.

(5) To assist the above operations, the symbol deinterleaving in the outer deinterleaver is preferably made deeper, over, e.g. four symbols, and a corresponding alteration is made at the transmitter.

In accordance with another feature of the invention, a second channel state indication determining means determines a carrier-by-carrier measure of channel state indication averaged over a plurality of symbols. A control means forms the control signal from the output of the averaging means and the output of the second channel state indication determining means.

These features of the invention can be used independently or together in various combinations. Other features and advantages of the present invention will be apparent from the description of the preferred embodiment below.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENT

The preferred embodiment is implemented as a DVB-T receiver. To enable an understanding of the present invention a description of the principles of a DVB-T transmitter and receiver are first described with reference to FIGS. 1 to 3. A channel state measurement system for use in DVB-T receivers and based on our European Patent Application EP-A-0 991 294 is then described with reference to FIG. 4. Subsequently a receiver embodying the invention in its various aspects is described with reference to FIG. 5 et seq.

DVB-T Transmitter

Figure 1:
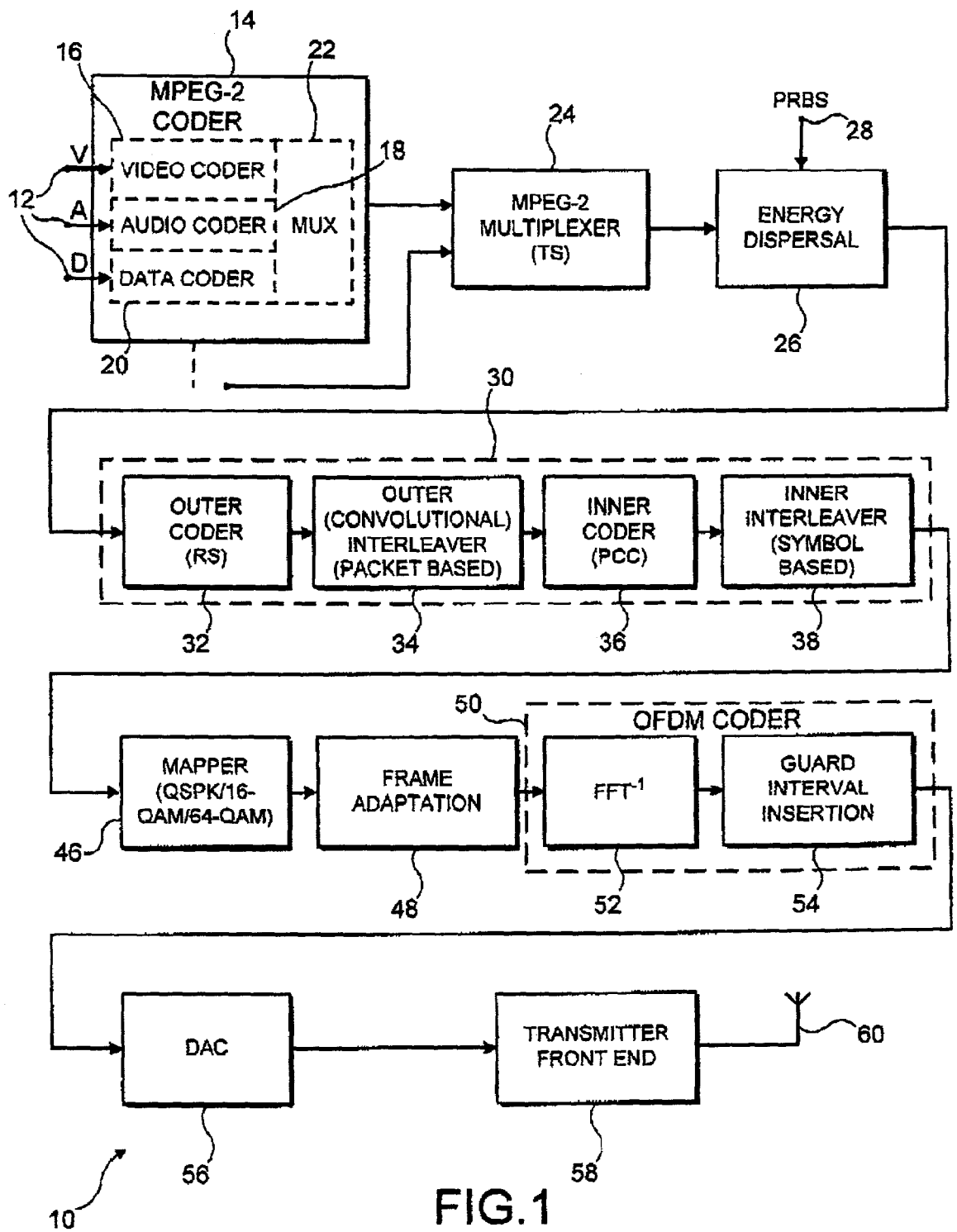
FIG. 1 is a schematic block diagram of a known DVB-T transmitter.

FIG. 1 is a block diagram of a transmitter 10 for use in the Digital Video Broadcasting standard for Terrestrial television (DVB-T) as defined in European Telecommunication Standard ETS 300 744 (hereinafter "the standard"). Reference should be made to that standard for further details; the following description is by way of a summary for the purpose of illustrating the present invention.

The transmitter receives video (V), audio (A), and data (D) signals from appropriate signal sources via inputs 12 and these are applied to an MPEG-2 coder 14. The MPEG-2 coder includes a separate video coder 16, audio coder 18 and data coder 20, which provide packetized elementary streams which are multiplexed in a programme multiplexer 22. Signals are obtained in this way for different programmes, that is to say broadcast channels, and these are multiplexed into a transport stream in a transport stream multiplexer 24. Although considered as part of the transmitter for the purposes of this specification, the components up to the multiplexer 24 will normally be located at the studio complex. The output of the transport stream multiplexer 24 consists of packets of 188 bytes and is applied to a randomiser 26 for energy dispersal, where the signal is combined with the output of a pseudo-random binary sequence (PRBS) generator received at a terminal 28. The randomiser more evenly distributes the energy within the RF (radio frequency) channel. The MPEG-2 coding and multiplexing and the randomising are not further described as they are not relevant to an understanding of the present invention. For further details of MPEG-2 reference may be made to standard ISO/IEC 13818 "Coding of moving pictures and associated audio". An introductory discussion may be found, for example, in "Digital Television" by Hervé Benoit, 1997, ISBN 0340691905.

The signal is now applied to a channel coding section 30 which is generally known as the forward error corrector (FEC) and which comprises four main components, namely:

an outer coder 32,
an outer interleaver 34,
an inner coder 36, and
an inner interleaver 38.

These will now be described. The two coding stages 32,36 provide a degree of redundancy to enable error correction at the receiver. The two interleaving stages 34,38 are necessary precursors for corresponding deinterleavers at a receiver so as to break up bursts of errors so as to allow the error correction to be more effective.

The outer coder 32 is a Reed-Solomon (RS) coder, which processes the signal in packets of 188 bytes and adds to each packet 16 error protection bytes. This allows the correction of up to 8 random erroneous bytes in a received word of 204 bytes. This is known as a (204, 188, t=8) Reed-Solomon code. This is achieved as a shortened code using an RS (255, 239, t=8) encoder but with the first 51 bytes being set to zero.

The outer interleaver 34 effects a Forney convolutional interleaving operation on a byte-wise basis within the packet structure, and spreads burst errors introduced by the transmission channel over a longer time so they are less likely to exceed the capacity of the RS coding. After the interleaver, the nth byte of a packet remains in the nth byte position, but it will usually be in a different packet. The bytes are spread successively over 12 packets, so the first byte of an input packet goes into the first output packet, the second byte of the input packet is transmitted in the second output packet, and so on up to the twelfth. The next byte goes into the first packet again, and every twelfth byte after that. As a packet contains 204 bytes, and 204=12×17, after the outer interleaving a packet contains 17 bytes that come from the same original packet.

Figure 2:
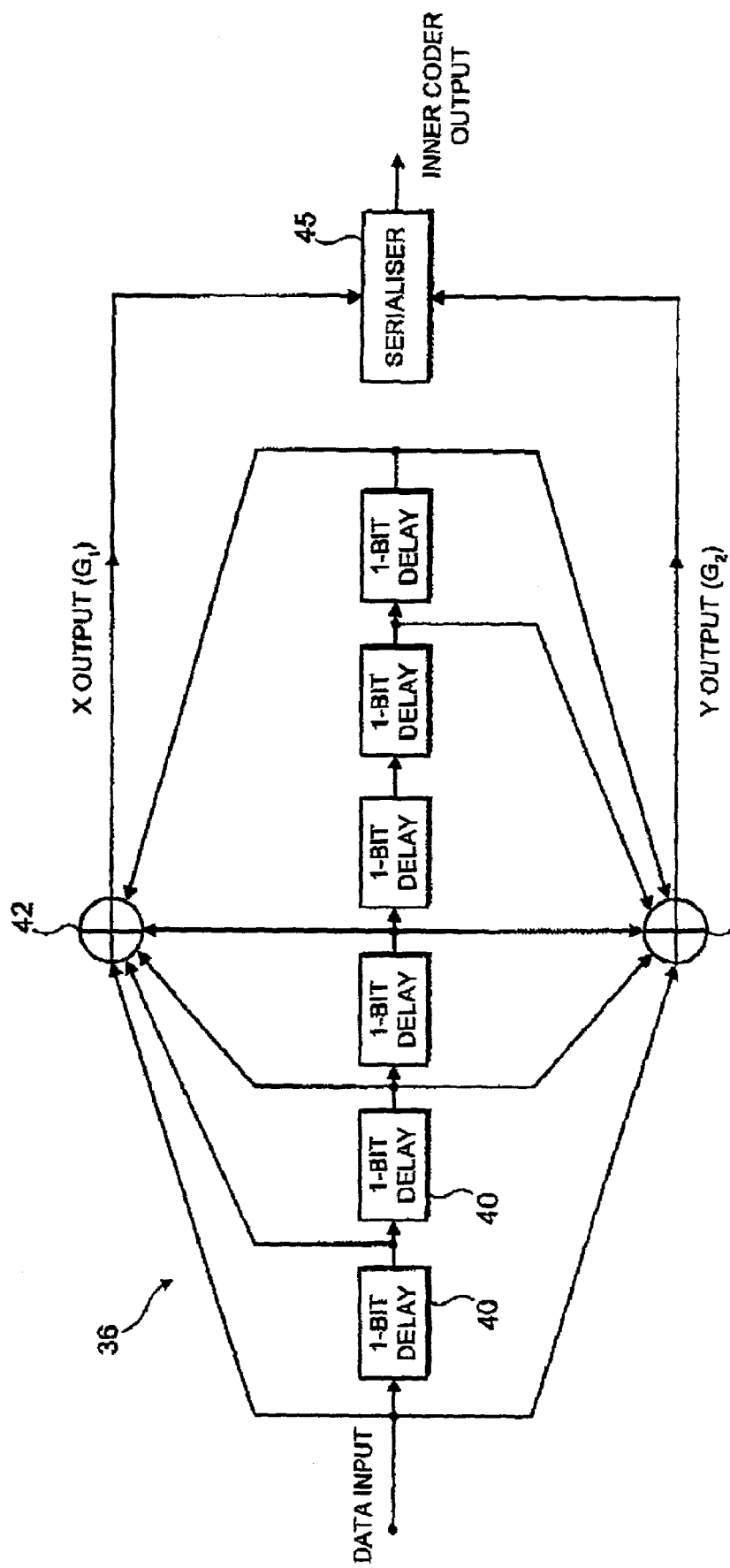
FIG. 2 shows the construction of the punctured convolutional coder forming the inner coder of the transmitter of FIG. 1.
Figure 3:
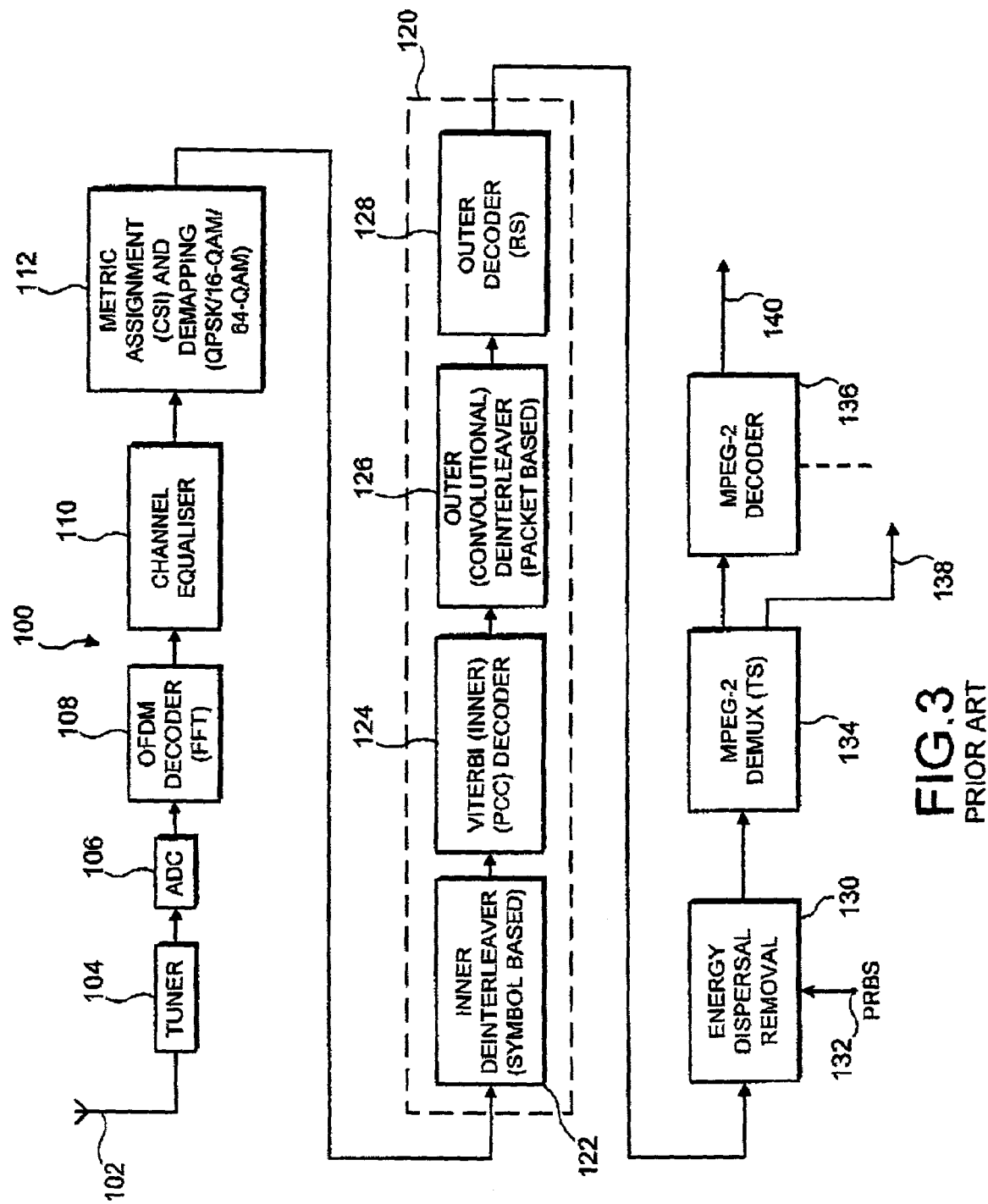
FIG. 3 is a schematic block diagram of a typical DVB-T receiver design.

The inner coder 36 is a punctured convolutional coder (PCC). The system allows for a range of punctured convolutional codes, based on a mother convolutional code of rate ½ with 64 states. FIG. 2 is a block diagram illustrating a hardware implementation of the convolutional coder. The data input is applied to a series of six one-bit delays 40 and the seven resultant bits which are available are combined in different ways by two modulo-2 adders 42,44, as shown. These adders provide the output of the inner coder in the form of an X or $G_1$ output and a Y or $G_2$ output, the letter G here standing for the generator sum. The X and Y outputs are combined into a single bit stream by a serialiser 45.

The puncturing is achieved by discarding selected ones of the X and Y outputs in accordance with one of several possible puncturing patterns. Without puncturing, each input bit gives rise to two output bits. With puncturing one of the following is achieved:

Every 2 input bits give 3 output bits
Every 3 input bits give 4 output bits
Every 5 input bits give 6 output bits
Every 7 input bits give 8 output bits This is set out in Table 2 in the standard; the punctured code rates are represented in the form 2/3, 3/4, 5/6 and 7/8. The puncturing takes place in the serialiser 45.

Returning to FIG. 1, the inner interleaver 38 in accordance with the standard is implemented as a two-stage process, namely bit-wise interleaving followed by symbol interleaving. Both are block based. First, however, the incoming bit stream is divided into 2, 4 or 6 sub-stream, depending on whether QPSK (quadrature phase shift keying), 16-QAM (quadrature amplitude modulation), or 64-QAM is to be used, as described below. Each sub-stream is separately bit interleaved and all the streams are then symbol interleaved.

The bit interleaver uses a bit interleaving block size which corresponds to one-twelfth of an OFDM symbol of useful data in the 2 k mode and ⅛s of an OFDM symbol in the 8 k mode. These two modes are explained below.

The symbol interleaver maps the 2, 4 or 6-bit words onto 1512 or 6048 active carriers, depending on whether the 2 k or 8 k mode is in use. The symbol interleaver acts so as to shuffle groups of 2, 4 or 6 bits around within the symbol. This it does by writing the symbol into memory and reading out the groups of 2, 4 or 6 bits in a different and permuted order compared with the order in which they were written into the memory.

Finally the groups of 2, 4 or 6 bits are applied to a mapper 46 which quadrature modulates the bits according to QPSK, 16-QAM or 64-QAM modulation, depending on the mode in use. (QPSK may also be represented as 4-QAM.) The constellations are shown in FIG. 9 of the standard. It will be appreciated that this requires 1, 2 or 3 bits on the X axis and 1, 2 or 3 bits on the Y axis. Thus while reference has been made to 2, 4 or 6 bits in the shuffling process, in fact the shuffling is applied to 1, 2 or 3 bits in the real part and 1, 2 or 3 bits in the imaginary part.

So-called hierarchical transmission can be used in which a high-priority stream and a low-priority stream are separately modulated.

The signal is now organized into frames in a frame adapter 48 and applied to an OFDM (orthogonal frequency-division multiplexer) coder 50. Each frame consists of 68 OFDM symbols. Each symbol is constituted by 1705 carriers in 2 k mode or 6817 carriers in 8 k mode. Using the 2 k mode as an example, instead of transmitting 1705 bits sequentially on a single carrier, they are assembled and transmitted simultaneously on 1705 carriers. This means that each bit can be transmitted for much longer, which, together with the use of a guard interval, avoids the effect of multipath interference and, at least in 8 k mode, allows the creation of a single-frequency network.

The duration of each symbol, the symbol period, is made up of an active or useful symbol period, and the guard interval. The spacing between adjacent carriers is the reciprocal of the active symbol period, thus satisfying the condition for orthogonality between the carriers. The guard interval is a predefined fraction of the active symbol period, and contains a cyclic continuation of the active symbol.

The predefined fractions are ¼, ⅛, 1/16 and 1/32. The total symbol duration is of the order of 250 μs for the 2 k mode and 1 ms for the 8 k mode.

The frame adapter 48 also operates to insert pilots into the signal. Some of the pilots can be used at the receiver to determine reference amplitudes and phases for the received signals. The pilots include scattered pilots scattered amongst the 1705 or 6817 transmitted carriers, as well as continual fixed pilots. The pilots are modulated in accordance with a PRBS sequence. Some other carriers are used to signal parameters indicating the channel coding and modulation schemes that are being used, to provide synchronization, and so on.

The OFDM coder 50 consists essentially of an inverse fast Fourier transform (FFT) circuit 52, and a guard interval inserter circuit 54. The construction of the OFDM coder will be known to those skilled in the art.

Reference is made to British Broadcasting Corporation Research and Development Report BBC RD 1996/8, P. Shelswell, "The COFDM Modulation System" with regard to OFDM generally, and to a paper by Stott, J. H., 1997, "Explaining some of the Magic of COFDM", Proceedings of the 20th International Symposium, Montreux 1997, pages 341 to 350, which describes how the various components of the forward error corrector co-operate with the OFDM coder to provide a very advantageous coding system.

Finally, the signal is applied to a digital to analogue converter 56 and thence to a transmitter 'front end' 58, including the transmitter power amplifier, and is radiated at radio frequency from an antenna 60.

DVB-T Receiver

The receiver construction is not specified by the standard ETS 300 744, but typically includes components corresponding to those in the transmitter but in reverse order. A generalised DVB-T receiver 100 is illustrated in simplified form in the block diagram of FIG. 3, with some elements which are not of particular relevance to the present invention omitted. Reference may also be made to European Patent Application EP-A-0 877 526 for a description of an integrated circuit forming the main component of a receiver.

In the receiver 100 an analogue RF signal is received by an antenna 102 and applied to a tuner or down-converter 104, constituting the receiver front end, where it is reduced to baseband. The signal from the tuner is applied to an analogue-to-digital converter 106, the output of which forms the input to an OFDM decoder 108. The main constituent of the OFDM decoder is a fast Fourier transform (FFT) circuit, to which the FFT in the transmitter is the inverse. The FFT receives the many-carrier transmitted signal with one bit per symbol period on each carrier and converts this back into a single signal with many bits per symbol period. The existence of the guard interval, coupled with the relatively low symbol rate compared with the total bit rate being transmitted, renders the decoder highly resistant to multipath distortion or interference.

Appropriate synchronisation is provided, as is well-known to those skilled in the art. In particular, a synchronising circuit will receive inputs from the ADC 106 and the FFT 108, and will provide outputs to the FFT and, for automatic frequency control, to the tuner 104.

The output of the OFDM decoder 108 is then applied to a channel equalizer 110. This estimates the channel frequency response, then divides the input signal by the estimated response, to output an equalised constellation.

Now the signal is applied to a circuit 112 which combines the functions of measurement of channel state, and demodulation or demapping of the quadrature modulated constellations. The demodulation converts the signal back from QPSK, 16-QAM, or 64-QAM to a simple data stream, by selecting the nominal constellation points which are nearest to the actual constellation points received; these may have suffered some distortion in the transmission channel. At the same time the circuit 112 estimates the likelihood or level of certainty that the decoded constellation points do in fact represent the points they have been interpreted as. As a result a likelihood or confidence value is assigned to each of the decoded bits.

The output of the metric assignment and demapping circuit 112 is now applied to an error corrector block 120 which makes use of the redundancy which was introduced in the forward error corrector 30 in the transmitter. The error corrector block 120 comprises:

an inner deinterleaver 122, an inner decoder 124, in the form of a soft-decision Viterbi decoder, an outer deinterleaver 126, and an outer decoder 128.

The inner deinterleaver 122 provides symbol-based deinterleaving which simply reverses that which was introduced in the inner interleaver 38 in the transmitter. This tends to spread bursts of errors so that they are better corrected by the Viterbi decoder 124. The inner deinterleaver first shuffles the groups of 2, 4 or 6 real and imaginary bits within a symbol (that is, 1, 2 or 3 of each), and then provides bit-wise deinterleaving on a block-based basis. The bit deinterleaving is applied separately to the 2, 4 or 6 sub-streams.

Now the signal is applied to the Viterbi decoder 124. The Viterbi decoder acts as a decoder for the coding introduced by the punctured convolutional coder 36 at the transmitter. The puncturing (when used) has caused the elimination of certain of the transmitted bits, and these are replaced by codes indicating a mid-value between zero and one at the input to the Viterbi decoder. This will be done by giving the bit a minimum likelihood value. If there is no minimum likelihood code exactly between zero and one, then the added bits are alternately given the minimum values for zero and for one. The Viterbi decoder makes use of the soft-decision inputs, that is inputs which represent a likelihood of a zero or of a one, and uses them together with historical information to determine whether the input to the convolutional encoder is more likely to have been a zero or a one.

The signal from the Viterbi decoder is now applied to the outer deinterleaver 126 which is a convolutional deinterleaver operating byte-wise within each packet. The deinterleaver 126 reverses the operation of the outer interleaver 34 at the transmitter. Again this serves to spread any burst errors so that the outer coder 128 can better cope with them.

The outer decoder 128 is a Reed-Solomon decoder, itself well-known, which generates 188-byte packets from the 204-byte packets received. Up to eight random errors per packet can be corrected.

From the Reed-Solomon outer decoder 128 which forms the final element of the error corrector block 120, the signal is applied to an energy dispersal removal stage 130. This receives a pseudo-random binary sequence at an input 132 and uses this to reverse the action of the energy dispersal randomiser 26 at the transmitter. From here the signal passes to an MPEG-2 transport stream demultiplexer 134. A given programme is applied to an MPEG-2 decoder 136; other programmes are separated out as at 138. The MPEG-2 decoder 136 separately decodes the video, audio and data to provide elementary streams at an output 140 corresponding to those at the inputs 12 on FIG. 1.

Channel State Information in DVB-T Receivers

We have previously proposed using channel state information in a DVB-T receiver in the manner described in our European Patent Application EP 0 991 239A. That application describes a system in which a measurement of channel state is obtained for each carrier of a COFDM signal and is used to vary the discrimination levels of the soft-decision quantiser which feeds the Viterbi decoder. The channel state information is obtained from, say, a 64-QAM signal by quantising the input with a hard-decision quantiser and obtaining the modulus of the difference between the quantised and unquantised signal. The channel state information is applied through a symbol-delay recursive filter to a control circuit. The output of the control circuit directly controls the soft-decision quantisers by varying their discrimination levels which they use in determining the likelihood or confidence values.

In practice the received 64-QAM constellation values do not always fall exactly on the nominal constellation points, but because of noise, distortion and interference, form a cloud of values in the vicinity of each point. As described below, channel state information (CSI) can be measured by determining how much the received values depart, on average, from the nominal positions.

Figure 4:
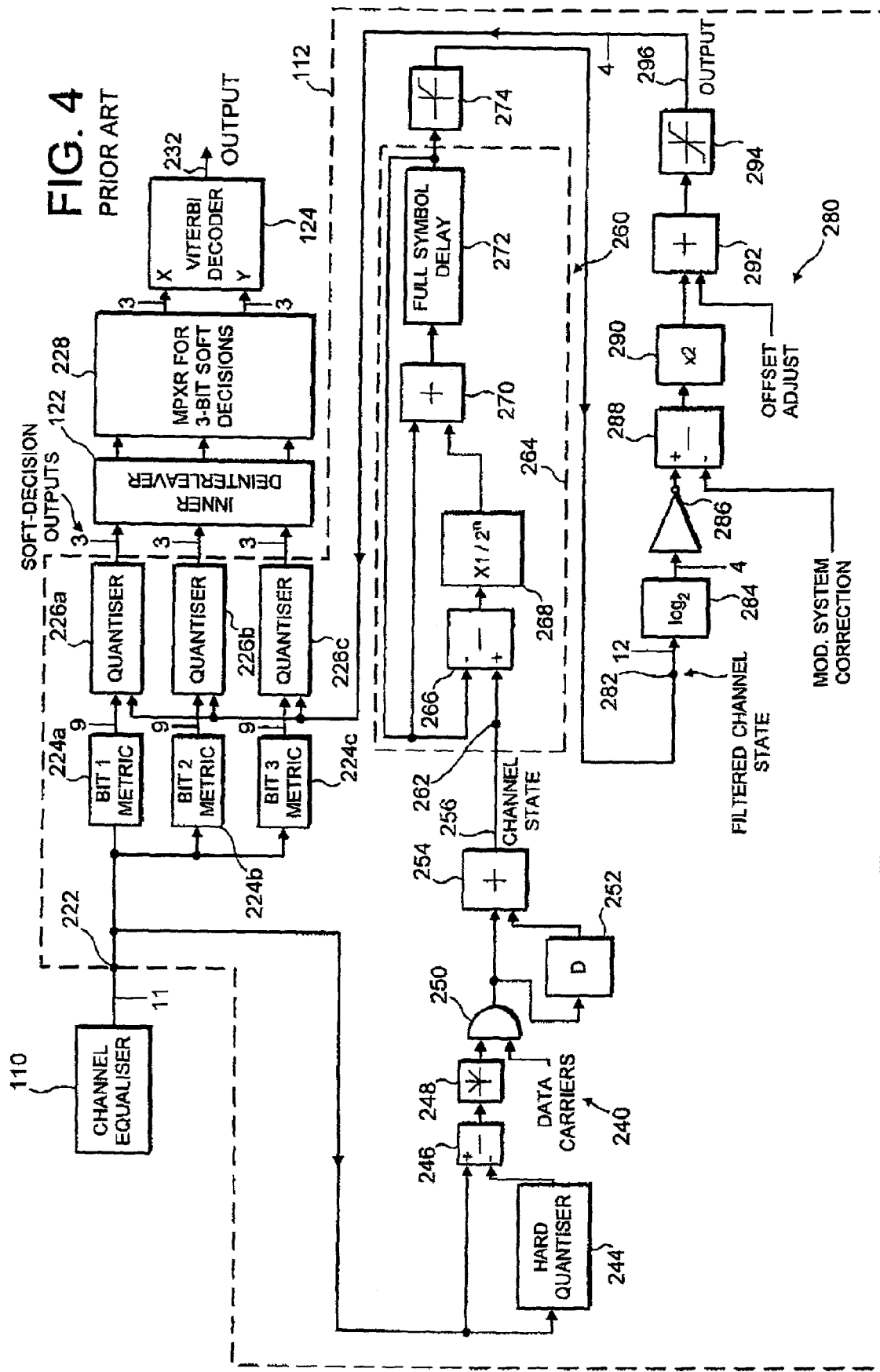
FIG. 4 shows the metric assignment and demapping circuit of the receiver of FIG. 3 when constructed in accordance with our European Patent Application EP-A-0 991 294.

FIG. 4 shows the system of our application EP 0 991 239A. The part corresponding on FIG. 3 to the channel equalizer 110, through the metric assignment and demapping circuit 112 and the inner deinterleaver 122 to the Viterbi decoder 124 is shown. The metric assignment and demapping circuit 112 is shown in more detail. In the circuit shown in FIG. 4, an 11-bit input signal is received at an input 222 from the output of the channel equaliser 110 and is applied to three metric characteristic generating circuits 224a, 224b, and 224c, which are referred to respectively as the bit 1 metric circuit, the bit 2 metric circuit, and the bit 3 metric circuit. The 9-bit output of each circuit 224 is connected to a respective adjustable quantiser 226, which provides a 3-bit soft decision output. The three 3-bit outputs are applied from the metric assignment and demapping circuit 112 via the inner deinterleaver 122 to a multiplexer (MPXR) 228 for the 3-bit soft decisions, which produces two 3-bit outputs to inputs X and Y respectively of the Viterbi decoder 124. The Viterbi decoder 124 provides an output 232.

Thus, before the 3-bit quantisation in the quantisers 226, the input signal received from the channel equaliser 110 is processed in the metric circuits 224 by a set of metric characteristics, which provide a measure of how far and in what sense the signal departs from the decision level for each bit.

The resulting signals are individually quantised in quantisers 226 to produce three-bit soft decisions, that is, a confidence value is associated with each decision. The confidence values are quantised relative to confidence value discrimination levels. After deinterleaving in the inner deinterleaver 122, the soft decisions are then multiplexed in multiplexer 228 appropriately for the convolutional code being used for presentation to the X and Y inputs of the Viterbi decoder 124.

FIG. 4 shows a circuit 240 which can be used for channel state measurement. The circuit 240 is also connected to input 222 for receiving the input signal, which comprises time-multiplexed real and imaginary (in-phase and out-of-phase) carrier components for successive OFDM carriers. That is, the real and imaginary components for each carrier are multiplexed, and the resultant multiplexes for the carriers are themselves multiplexed. During any one symbol period all the carriers are processed. The input signal is applied to a 'hard' quantiser 244 and to the non-inverting input of a subtracter 246. The output of the quantiser 244 is connected to the inverting or subtractive input of the subtracter 246. The output of the subtracter is then connected through a rectifier or modulus circuit 248, which inverts negative values, to one input of a two-input AND-gate 250. The other input of the AND-gate 250 receives a flag indicating whether the carrier is a pilot of the DVB-T system, as referred to above, or rather is a data carrier carrying information. Operation is suppressed for the pilot carriers. The output of the AND-gate 250 is applied both directly and through a delay 252 to an adding circuit 254, the output 256 of which forms the output of the channel state measurement circuit. The delay 252 demultiplexes the real and imaginary values for each carrier, and the adder 254 adds the real and imaginary parts of the signal value. The circuit 240 produces an output during a particular time period for each of the carriers the condition of which is to be monitored.

The method used in the equipment shown in circuit 240 to calculate the channel state consists, for each carrier, of first determining in the quantiser 244 the nearest nominal level for each component of the complex input signal, and then subtracting the thus-determined nearest nominal level from the component of the complex input signal itself. This gives a measure of the deviation from the correct value, as introduced by the transmission channel. As noted, at this point the signal for each carrier is carried for convenience as time-multiplexed real and imaginary components. The process of subtracting the nearest nominal level is simplified considerably by arranging that the nominal constellation positions are aligned with transitions of the major bits of the binary-encoded words used to represent the real and imaginary components. The resulting difference signals from the subtracter 246 are rectified in the rectifier 248 to produce positive-going signals, and the contributions of the pilot carriers of the DVB-T system are suppressed by the AND-gate 250, as noted above. The real and imaginary values for each carrier are then demultiplexed by the delay 252 and are added together by the adder 254, to provide an approximation to the error magnitude for that carrier.

While the exact length of the error vector could be measured by evaluating the root-sum-of-squares of the real and imaginary errors, this is unnecessarily accurate and using the sum of the real and imaginary errors provides a useful reduction in complexity.

FIG. 4 also shows a symbol-recursive filter 260 for averaging the carrier error values as determined by the circuit 240. The filter 260 is connected to the output of the circuit 240 and receives at an input 262 the measured channel state error values. In the example of the filter 260 shown, these values are applied to a symbol delay filter 264. The measured channel state values are filtered with a recursive low-pass filter incorporating a full symbol period delay 272, a subtracter 266, attenuator 268, and adder 270, so that successive error values from each carrier position are averaged together. The signal is then clipped in circuit 274 to remove any negative values (caused by quantising errors) and to limit the range of positive values, before being passed to the quantiser selection process. Our European Patent Application 0 991 239A describes the detailed construction of this example of the symbol-recursive filter 260 (see FIG. 6 of that application).

The channel state information could be used simply to reject unusable carriers. However, performance can be improved by modifying the soft-decision values according to the level of impairment signalled by the channel state measurement. A control law can be developed by a combination of theory and practical optimisation to relate the modified soft decisions to the channel state values.

This is illustrated in FIG. 4, which shows a circuit 280 which implements a control law. The circuit 280 has an input 282 for receiving the output of circuit 260 which is applied to a logarithm circuit 284 which takes the logarithm of the input value to base two. The output of the circuit 284 is applied through an inverter 286 to the non-inverting input of a subtracter 288. The inverting input of the subtracter receives a correction signal which is dependent upon the particular type of modulation system being used. The output of the subtracter 288 is multiplied by two in a multiplier 290, the output of which is applied to one input of a two-input adder 292 which also receives an offset adjustment. The output of the adder 292 is applied to a limiter or clipper 294, the output 296 of which constitutes the output of the control law circuit 280.

The circuit 280 operates by first taking the base-two logarithm of the channel state signal in the logarithm circuit 284. Next, the log signal is bit-wise inverted by inverter 286, so that a large value now represents a good-quality signal. A shift is then subtracted in subtracter 288 to take account of the different channel state sensitivities of different modulation systems. This occurs because of the differing spacing between points in the constellation for systems other than 64-QAM. Because of the logarithm, the shift gives the effect of dividing the channel state measurement by a factor. The resulting signal is multiplied by two in multiplier 290 to give the effect of using the square of the channel state measurement. This converts the voltage carrier-to-noise measurement into a power carrier-to-noise measurement. An adjustable offset, optimised empirically by measurement, is then added in adder 292 and the result clipped in clipper 294 to take account of the range of control available for modifying the soft decisions.

The use of the logarithm circuit 284, which, notably, is not followed by any antilogarithm circuit, might be thought to distort the processing, but in fact is found to lead to more efficient processing. The logarithm operation does not need to be conducted with high accuracy; a very low-grade logarithm using only one binary digit for the mantissa can be employed.

The effective discrimination levels for the soft decisions in the Viterbi decoder are altered according to the measured channel state. That is to say, the hard decisions are fixed, and depend solely on which of a plurality of possible values is nearest to the received value. The confidence value associated with any decision and which makes it a soft decision is also quantised, and this quantisation is altered in dependence upon the channel state. The metric circuits 224 make the hard decisions, and the adjustable quantisers 226 do not alter those decisions but quantise and modulate the confidence values. The quantiser levels used to produce the soft decisions are altered in dependence upon the channel state.

The circuit illustrated in FIG. 4 thus shows how the circuits 240, 260, 280 are used to provide a system in which the channel state information is used in making the soft decisions in the decoder. The output of the circuit 280 is applied to control the adjustable quantisers 226 which produce respective soft decision outputs. These are then applied to the inner deinterleaver 122, multiplexer 228, and Viterbi decoder 124.

The quantisers 226 may provide ten different quantising laws selected by the 0 to 9 states of the 4-bit quantiser control signal from circuit 280, with state 9 representing the finest quantiser to be used for the highest quality signals. The quantiser laws are produced approximately at gain steps of $\sqrt{2}$, so that the upper three bits of the control signal select five levels of bit shift, and clip the signals at the extremes of each range to produce a 5-bit signal. The soft decision value is then produced using the levels 12, 8, 4, 0, −4, −8 and −12 for unity gain values, or levels 9, 6, 3, 0, −3, −6 and −9 to approximate for $frax;1;mt;epmrl;\sqrt{2rlxmx}$ gain values. Thus for a carrier signal of very low quality, which is either originally small (and therefore noisy) or obscured by interference, the quantisation levels are spread over a wide range so that the standardised signal levels will tend to fall in the 011 and 100 states, indicating low confidence in the values from this carrier to the Viterbi decoder.

In an alternative arrangement (not described in our aforementioned European Patent Application) the quantisers 226 provide fourteen different quantising laws, selected by the 12 to 15 and 0 to 9 states of the control signal 296. State 12 represents the coarsest quantiser to be used for the poorest quality signals, and state 9 represents the finest quantiser to be used for the highest quality signals. In this case the Operation of the clipper 294 in the control law circuit 280 is now to clip to the range −4 to 9 in two's complement. Then by discarding the sign bit, the unsigned numbers 12 to 15 and 0 to 9 are successively obtained. There are now seven levels of bit shift.

Preferred Embodiment of the Invention

The various features of the preferred embodiment of the invention will now be described with reference to FIGS. 5 to 8 of the drawings.

Improved Channel State Indication

In accordance with one aspect of the preferred embodiment we propose to improve the measure of channel state indication relative to that of FIG. 4 so as to identify the degree of corruption of each OFDM symbol. As was described with reference to FIG. 4, the channel state indication is obtained by determining the distance from the received QAM or QPSK point to the nearest constellation point, and then in filter 260 averaging in time, that is over several symbols on one carrier. We now propose, instead of averaging in time, to average separately for each symbol along the frequency axis, that is for all the carriers in one symbol (or at least part of a symbol, the determination period).

Figure 5:
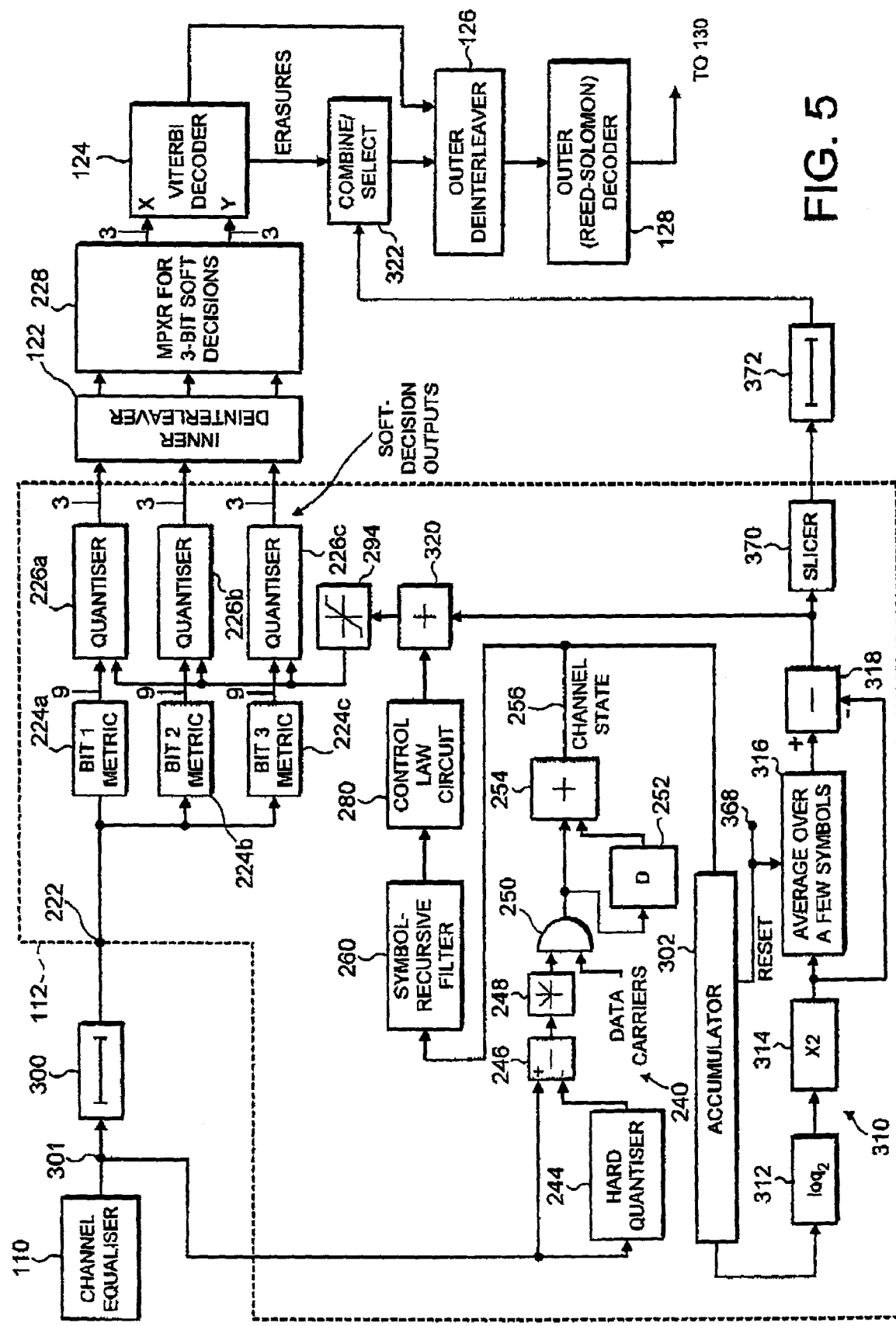
FIG. 5 is a block schematic diagram of part of a DVB-T receiver embodying the present invention in its various aspects.

This is illustrated in FIG. 5 which shows how FIG. 4 is altered in accordance with this proposal.

Much of the circuit of FIG. 5 is the same as FIG. 4 and is identified by the same reference numerals, and is not therefore described again. The symbol-recursive filter 260, and the control law circuit 280 are not shown in detail, save that the limiter or clipper 294 is shown separately from the rest of the control law circuit 280. The output of the limiter or clipper 294 controls the discrimination values in the quantisers, as before.

In the improved channel state measurement, it is necessary to provide a delay of one symbol so that it is possible to make the measurement on a given symbol and to use the measurement in assigning metrics from that same symbol. To achieve this a one-symbol delay 300 is connected between the channel equaliser 110 and the metric assignment and demapping circuit 112. The bit metric circuits 224 are connected to the output of the one-symbol delay 300 whereas the channel state measurement circuit 240 is connected at 301 to the output of the channel equaliser prior to the one-symbol delay 300.

The output of the channel state measurement circuit 240 is applied both to the symbol-recursive filter 260 and to a circuit 302 which sums the signal for all the carriers over a one-symbol period. The output of this accumulator 302 is then applied to a control law circuit 310, which comprises a logarithm circuit 312 which takes the logarithm of its input value to base two. The output of the circuit 312 is applied to a multiplier 314 which multiplies by two. This converts the voltage measurement into a power measurement. The output of the multiplier 314 is applied both through an averager 316 to the non-inverting input of a subtracter 318 and directly to the inverting input of the subtracter.

Figure 6:
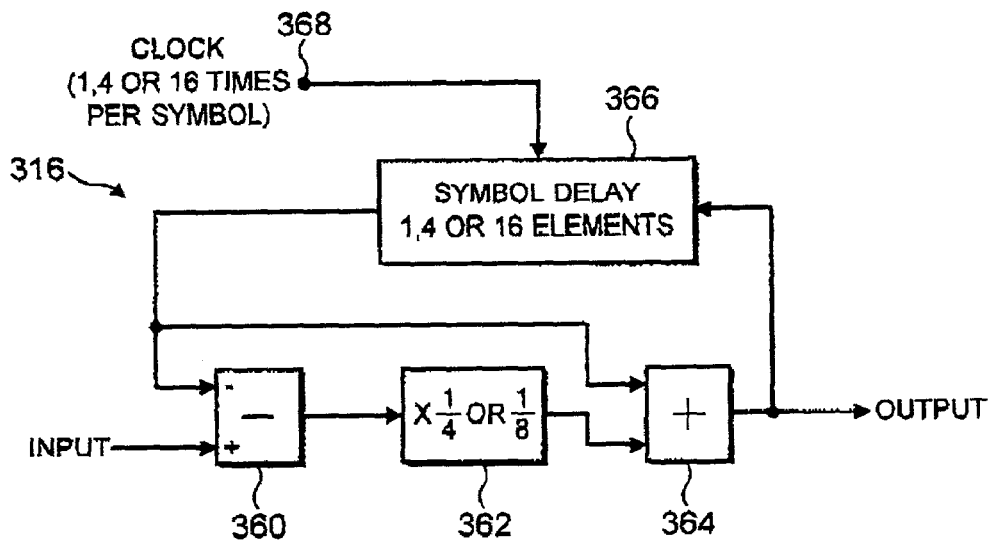
FIG. 6 is a block diagram of an averager circuit used in FIG. 5.

The construction of the averager 316 is shown in FIG. 6. The input from multiplier 314 is applied to the non-inverting input of a subtracter 360, the output of which is applied to a divider (or multiplier) 362 which divides by 4 or 8, i.e. multiplies by ¼ or ⅛. The output of the divider 362 is applied to one input of an adder 364, the output of which constitutes the output of the averager 316 and is supplied to the subtracter 318. The output of the adder 364 is also applied to the input of a clocked symbol delay 366 which can provide a clocked delay of 1, 4 or 16 elements. The output of the symbol delay 366 is applied both to the other input of the adder 364 and to the inverting input of the subtracter 360.

Thus the averager 316 foams a decaying average of recent symbol-by-symbol measurements of channel state. The decay time constant is either 4 or 8 symbols, set by the constant factor of ¼ or ⅛ in the element 362. As an alternative to the decaying average filter shown in FIG. 6, a running average filter could alternatively be used.

The averager 316 is clocked at a clock rate of 1, 4 or 16 times per symbol received at an input 368. This clock signal also resets (or clears) accumulator 302. Assuming one clock pulse per symbol and one element in the delay 366, the accumulator 302 and averager 316 work together to average the channel state. Accumulator 302 averages over one symbol, or part of one symbol. Recent ones of these averages are then averaged in averager 316. In 2 k mode, the averaging in accumulator 302 can be over each quarter symbol, with 4 clock pulses per symbol and 4 elements in the delay. In 8 k mode, the averaging in accumulator 302 can be over each one-sixteenth of a symbol, with 16 clock pulses per symbol and 16 elements in the delay. Other sub-divisions would also be possible. If one of the latter two modes is adopted, the symbol delay 300 needs to become a one-quarter symbol delay in 2 k mode or a one-sixteenth symbol delay in 8 k mode. It will be appreciated that one-quarter of a 2 k symbol and one-sixteenth of an 8 k symbol represent the same amount of physical storage, and represent in each case a substantial saving in the storage requirement relative to a full symbol. This saves memory in the compensating delay 300, while still achieving the desired effect of comparing the current symbol with the average of previous ones. A given one quarter or one-sixteenth of a symbol is compared in subtracter 318 with the corresponding fraction in previous symbols. The timing is arranged such that the accumulator 302, averager 316 and subtracter 318 operate on the same part of a symbol at the same time, so that like is averaged with like in averager 316 and is then compared with like in subtracter 318.

The delay 300 requires 30,240 bits (3,780 bytes) of extra memory for the 2 k mode and four times more than that for the 8 k mode. In practice, averaging over a few hundred carriers (in the 2 k mode) is likely to give sufficient noise reduction, and it is possible therefore to sum for only one quarter of the available carriers. This can give incorrect results if the channel has a non-uniform or tilted frequency response, because the average over a few hundred carriers might not be representative of the symbol as a whole.

If the delay 300 is not a whole symbol delay but rather is a fraction of a symbol delay, then the channel state measurement circuit 240 needs an equal compensating delay. There are several ways in which this can be done, including the following:

(i) include two channel state measurement blocks 240, with their inputs connected one to each side of the delay 300;
(ii) insert the required delay after the logarithm circuit 284 (see FIG. 4) in the control law circuit 280;

(iii) provide a second access point to the full symbol is delay memory 272 (see FIG. 4) in the symbol-recursive filter 260, to provide the required delay, and make that the output of the symbol-delay filter 264.

Reverting to the description of FIG. 5, the output of the subtracter 318 is then combined with the output of the main control law circuit 280 (taken prior to the clipper 294) in an adder 320. The output of the adder 320 is then applied through the clipper 294 to control the discrimination levels of the quantisers 226. The output of the subtracter 318 is also supplied as a channel state indication for use in connection with the outer decoder 128, as described below.

The control law circuit 310 operates to take the logarithm of the measurement, as in the control law circuit 280, and convert the voltage measurement to a power measurement in the multiplier 314. Then the difference is taken in the subtracter 318 between the resultant measurement for the current symbol and the average of recent symbols. This difference is then added in the adder 320 to the carrier-by-carrier channel state indication provided by the circuits 240, 260 and 280. Normally the result of the symbol-by-symbol measurement is similar from symbol to symbol so that the output of subtracter 318 is near to zero. Under these conditions the symbol-by-symbol measurement has little effect on the control signal fed to the adjustable quantisers 226. However, if a symbol is affected by impulsive interference, the measurement is higher than on other symbols, and the output of the subtracter 318 is strongly negative. This reduces the control signal fed to the adjustable quantisers 226 and hence reduces the degree of confidence of the soft decisions. In this way the confidence information includes information about impulsive interference.

Impulsive interference affects isolated symbols and so is not reflected in the output of the known measurement circuit of FIG. 4 because the circuit has to include a filter like the symbol-recursive filter 260, which filters out changes occurring on isolated symbols. The improved information provided by the arrangement shown in FIG. 5 and described above improves the effectiveness of the Viterbi decoder in correcting errors, namely in this instance, errors arising from impulsive interference. To enable the improved channel state information to give a benefit, deeper inner interleaving should also preferably be used with a depth of at least four symbols for the DVB-T option 64-QAM, rate ⅔. An example of deeper inner interleaving is described below.

Errors and Erasures Decoding in Reed-Solomon Decoder

In accordance with another aspect of the present embodiment we propose the use of the errors and erasures feature of the Reed-Solomon decoder. This requires a slightly more complex decoder, but it increases the number of errors that can be corrected. An erasure is a byte (8-bit word) which is known to contain one or more bit-errors and is flagged as such to the Reed-Solomon (RS) decoder. The RS decoder can correct twice as many erasures as it can errors, where an error is a byte which contains one or more bit-errors not signalled to the RS decoder. In fact the error correction capacity of the RS code per block or packet is:

$$2r + e \leq t$$

where: r is the number of errors
e is the number of erasures
t is the number of check bytes.

Thus, a mixture of errors and erasures can also be corrected.

Clearly, to do erasures decoding it is necessary to have 'erasures' information. Two ways of providing the erasures information will now be described.

Erasures Signalling from Channel State

As described above with reference to FIG. 5, the channel state measurement circuit 240, the accumulator 302, and the control law circuit 310 provide a channel state indication for each received symbol on the OFDM multiplex. The output of the subtracter 318 is sensitive to the occurrence of impulsive interference and this output can therefore be used to provide the erasures signalling to the outer or Reed-Solomon decoder 128. To this end the output of subtracter 318 is connected through a combining or selecting circuit 322 to an input of the outer deinterleaver 126, the output of which is applied to the Reed-Solomon decoder 128. The construction of the Reed-Solomon decoder is itself well-known and is not further described here; reference may be made to "Error-Correcting Codes", Peterson W. W. and Weldon E. J., 2nd edition, MIT Press, Cambridge, Mass. U.S.A., 1972, see Chapter 9 which describes a Reed-Solomon decoder which does erasures decoding.

The erasures information applied to the outer deinterleaver 126 can be taken from either of two sources, namely from the Viterbi decoder 124 (as described below) or from the control law circuit 310, that is from subtracter 318. The latter is applied through a slicer (or threshold circuit) 370 which gives a one-bit signal indicating 'normal' or 'erased' and then through a delay 372 which allows for the delay of the inner deinterleaver 122 and the Viterbi decoder 124 and the delay 300. The output of delay 372 and the erasures output of the Viterbi decoder are applied to the combining or selecting circuit 322. which of its inputs is used depends on the parameters of the COFDM system. For DVB-T, the erasures output of the Viterbi decoder is normally preferred, and in a dedicated receiver elements 322, 370 and 372 are replaced by a straight connection from the erasures output of the Viterbi decoder 124 to the outer deinterleaver 126. However, if the combination of outer interleaving depth and Reed-Solomon code redundancy is strong enough, the channel state indication may be better. The best arrangement is determined empirically for any given system.

In a modification, if the erasures information is taken solely from the channel state indication, the delay in the inner deinterleaver is one symbol, and the symbol-by-symbol channel state indication is not used in the quantiser control (adder 320 is omitted and the output of subtracter 318 is applied solely to the slicer 370), then the delay 300 can be omitted, and the delay 372 consequently reduced.

In any event, each erasure flag is associated with a specific byte, and this association should be retained through the outer deinterleaving process. Thus the erasure flags are inputted to, and pass through, the outer deinterleaver 126, and the deinterleaver needs to store 9 bits rather than 8 for each byte, the $9^{th}$ bit holding the associated erasure flag. The erasure flags can then be used by the Reed-Solomon decoder 128.

Erasures Signalling from Viterbi Decoder

As noted above, in addition to, or instead of, the signalling from the channel state measurement as just described, we have appreciated that the erasures signalling can advantageously be obtained from the Viterbi decoder. This is illustrated in the block schematic diagram of FIG. 7.

Figure 7:
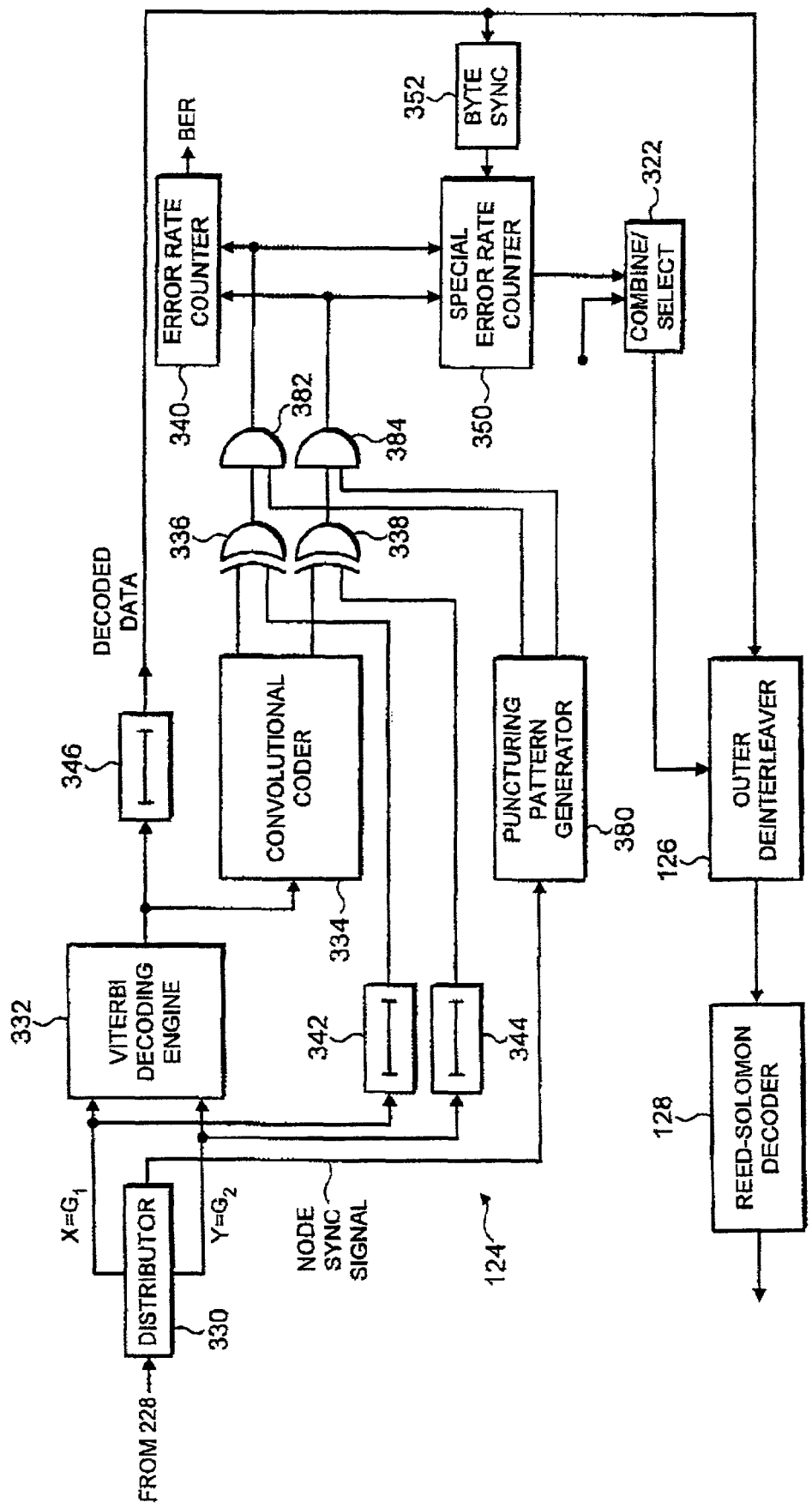
FIG. 7 shows an improved Viterbi decoder used to signal erasures to the Reed-Solomon decoder in the circuitry of FIG. 5.

In FIG. 7, the Viterbi decoder 124 is seen to receive from the multiplexer 228 a signal which is separated or distributed into the X or $G_1$ signal and the Y or $G_2$ signal, corresponding to the similarly named signals in the inner coder at the transmitter described above and illustrated in FIG. 2. The separation or distribution may take place in the multiplexer 228 as shown in FIG. 5 or in a separate distributor 330 as shown in FIG. 7.

The $G_1$ and $G_2$ signals are applied to the main Viterbi decoding engine 332, which is of a type known to those skilled in the art and is not therefore further described here. Reference may be made to "Error-Correction Coding for Digital Communications", Clark G. C. and Cain J. B., Plenum, New York, 1981, Chapter 6, for further details. It is common in a Viterbi decoder to re-encode the decoded output of the decoding engine and to compare it with a suitably delayed version of the incoming hard decisions, to give an estimate of the raw bit error rate (BER). This is achieved by a convolutional coder 334 connected to the output of the decoding engine 332, and two exclusive-OR gates 336,338. The first exclusive-OR gate 336 compares the $G_1$ outputs of the distributor 330 and the coder 334 and the second exclusive-OR gate 338 compares the $G_2$ outputs of the distributor 330 and the coder 334. The distributor 330 also produces a node synchronisation signal, which indicates the starting-time of each repeat of the puncturing pattern. This controls a puncturing pattern generator 380 which is arranged to produce the pattern correctly-phased in relation to the output of the convolutional coder 334. These signals are fed to AND gates 382, 384 which blank out any error indications which may appear on punctured bits. The punctured bits were not actually transmitted and so do not give rise to errors to be counted; the $G_1$ and $G_2$ signal (as the case may be) does not carry valid information during a punctured convolutional code symbol. The errors in $G_1$ and $G_2$ are counted in an error rate counter 340 which gives a measure of the BER, to give a long-term value for the BER.

Compensating delays 342,344 are provided for the $G_1$ and $G_2$ signals respectively to allow for the delay caused in the decoding engine 332, and a compensating delay 346 is connected to the output of the decoding engine 332 to allow for the delay caused in the convolutional coder 334 and a special error rate counter 350 (see below). The decoded data output from the delay 346 is applied to the outer deinterleaver 126, shown at the bottom of FIG. 7.

The additional or special error rate counter 350 receives the outputs of the gates 382,384. The error rate counter 350 determines the error rate over a short stretch of the decoded data, for example three bytes or 36 coded bits. A byte's-worth of data outside the convolutional code (i.e. before the convolutional encoder or after the Viterbi decoder) corresponds to 12 bits'-worth of data inside the convolutional code, at rate ⅔ (i.e. after the convolutional encoder and before the Viterbi decoder). The ratio of 8 to 12 is ⅔. The raw BER is necessarily counted on coded bits whilst the erasures information obtained from it is being attached to the decoded bits, after they have been grouped into bytes. Thus three bytes here contain 36 bits. It the number of errors in the 36 bits is greater than a predetermined value, for example 9, then the middle of the three bytes is marked as an erasure. Thus the three-byte windows overlap so that the test is made for each byte. The fact that a byte is marked as an erasure is signalled to the erasures input of the Reed-Solomon decoder, through the combining/selecting circuit 322 of FIG. 5 if appropriate.

The window defining the short stretch of data can be of length other than three bytes. It should be centred as nearly as possible on the byte which is being tested but need not be a whole odd number of bytes or even a whole number of bytes at all. The optimum number of bytes in the window is best determined empirically, as it is dependent upon factors such as the code rate. Preferably the window will be chosen so that (a) the probability of falsely detecting that the Viterbi decoder is failing when it is in fact succeeding, and (b) the probability of falsely detecting that it is succeeding when it is in fact failing, are both small. 'Small' might here mean less than 1 in 1000. Typically the window may be in the range of 2 to 9 bytes or preferably 2 to 5 bytes.

Appropriate synchronising to the bytes of the decoded data is achieved by a synchronisation circuit 352.

It will be appreciated that at code rates ¾, ⅚ and ⅞, there is not a whole number of cycles of the puncturing pattern in a byte. Thus, different bytes have different numbers of coded bits corresponding to them. For example, at rate ¾, bytes may correspond to either 10 or 11 coded bits. This means that the special error rate counter 350 needs to receive information about the phase of the puncturing pattern. This can be derived either from the node synchronising signal from the distributor 330, or, perhaps preferably, from the pattern itself from the puncturing pattern generator 380. For simplicity, neither of these connections is shown on FIG. 7. Then the counter 350 can set its counting period to be a given number of coded bits, and the number of errors is counted over this counting period.

The use of erasures signalling obtained from the Viterbi decoder in this way improves the operation of the Reed-Solomon decoder and hence of the receiver as a whole in the presence of impulsive interference, and in the presence of any other type of channel impairment. The operation of the special error rate counter over a small number of bytes makes this particularly advantageous.

Improved Inner Interleaving/Deinterleaving

As described above, the inner interleaver 38 at the transmitter effects a two-stage interleaving operation, namely bit-wise interleaving followed by symbol interleaving. They are described in section 4.3 of the DVB-T standard and illustrated in FIGS. 7 and 8 thereof. We have appreciated that it would be desirable to increase the depth of the inner interleaving such as to bring the Viterbi decoder into play at greater received error rates, and that it is not necessary to confine the symbol interleaving to a single symbol. The Viterbi decoder used as the inner coder is better suited to dealing with high error rates than the Reed-Solomon decoder.

The symbol interleaving has increased depth so that the interleaving is now done over a block of size greater than one symbol and preferably equal to at least 4 symbols. The bit-wise interleaving stage is unchanged. The symbol interleaving stage operates by writing groups of 2, 4 or 6 bits for the real and imaginary components of the signal into memory and reading them from memory in a different, permuted order. Corresponding alteration is made to the inner deinterleaver 122 at the receiver.

Figure 8:
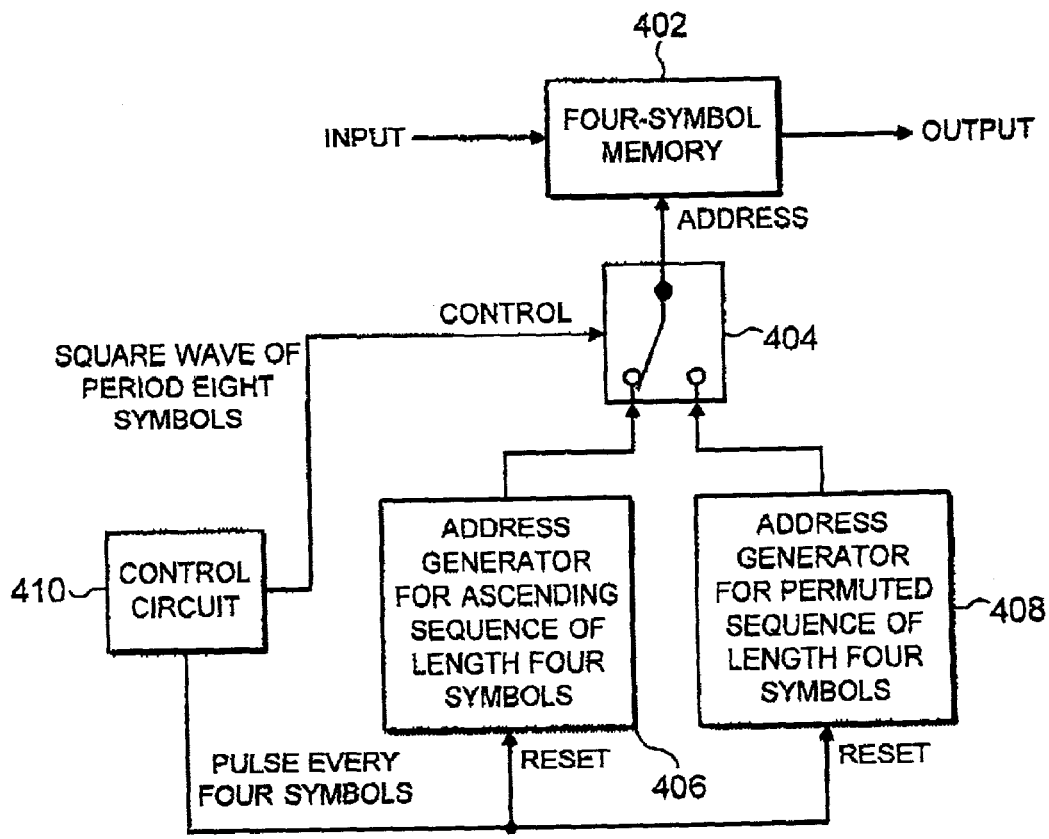
FIG. 8 illustrates the operation of an inner interleaver with increased depth.

FIG. 8 is a block diagram of an inner interleaver 400 with greater depth. The deinterleaver is essentially identical, see below. It uses a four-symbol memory 402 instead of a one-symbol memory. The memory 402 is addressed by the output of a controlled selector switch 404. The two inputs which the switch selects from are an address generator 406 for generating ascending sequences of length of four symbols and an address generator 408 for generating permuted sequences of length of four symbols. A control circuit 410 controls the switch and also resets the two address generators. The timing signals provided by the control circuit 410 are clearly indicated on the figure.

Increasing the block size by a factor of four will increase the memory requirement by a factor of four also. For the 2 k DVB-T mode, the amount of memory needed in the inner deinterleaver 122 at the receiver will typically increase from 36,288 bits (4,536 bytes) to 145,152 bits (18,144 bytes). For the 8 k mode the figures need to be four times as large, so the memory will increase from 145,152 bits (18,144 bytes) to 580,608 bits (72,576 bytes). However, some existing demodulators are dual-mode and so already have 145,152 bits available for use when in the 8 k mode. This means that they already have sufficient memory available for interleaving with 4-symbol blocks when in the 2 k mode.

The main difference between the interleaver at the transmitter and the deinterleaver at the receiver is that the sense of the control (switching between ascending and permuted address sequences) is reversed. The other difference is that the interleaver stores 1-bit data, the convolutionally coded bits, whilst the deinterleaver stores 3- or 4-bit data, the soft decisions about the coded bits. The changes to Section 4.3.4.2 of the Standard follow in a straightforward manner; everything becomes four times as long. Thus in 2 k mode there are now 48 groups of words from the bit interleaver, and in 8 k mode, 192. $N_{max}$ becomes 6048 in 2 k mode and 24192 in 8 k mode. $N_{max}$ becomes 8192 in 2 k mode and 32768 in 8 k mode. Where the Standard says "$y_{H(q)}=y'_q$ for even symbols" and "$y_q=y'_{H(q)}$ for odd symbols" (which specifies the phasing of the control), it needs to say "$y_{H(q)}=y'_q$ for the first group of four symbols in a super-frame and alternate groups of four symbols after that" and "$y_q=y'_{H(q)}$ for the second group of four symbols in a super-frame and alternate groups of four symbols after that". The details of the longer permuted sequence generators can be defined by new versions of Tables 3a and 3b and FIGS. 8a and 8b.

The interleaving depth does not have to be four symbols as described, though use of at least four symbols is desirable, at least in the 2K mode of DVB-T with a code rate of ⅔ (as used in the United Kingdom). This reduces the BER from, say, 1 in 6 (as with 64-QAM) to less than 1 in 20, so that the Viterbi decoder can now succeed. The maximum useful interleaving depth will be typically in the range 0.1 to 0.5 seconds. This corresponds to around 1000 to 2000 symbols in the 2K mode and 250 to 500 symbols in the 8K mode. The upper limit will be set by the practically of including a large amount of memory, how much delay can be tolerated, and where there is little further improvement in reception. The optimum value is best determined empirically.

The advantage of using the extra memory is that the system has greater ruggedness, in that impulsive interference of greater duration will be susceptible to correction by the Viterbi decoder. To implement this proposal modifications are however required both at the transmitter and the receiver, thus requiring an amendment to the standard.

This feature of improved interleaving with greater depth may be applicable to systems other than DVB-T which use many-carrier transmission with concatenated codes, for example the Asymmetric Digital Subscriber Line (ADSL) system for telephone line communication and Digital Radio Mondiale (DRM).

Many modifications may be made to the system described and illustrated by way of example. The many features of the system may be used independently of each other or in combinations other than those specifically disclosed. Whereas the description has been given in terms of hardware components, the system may in large part be implemented in software, in which case the Figures can be regarded as being in the nature of flow chart diagrams.

The invention claimed is:

1. Apparatus for determining channel state information from a many-carrier signal received over a channel, the apparatus comprising:

an input for receiving a received many-carrier signal, the received many-carrier signal comprising many data carriers representing a sequence of data values in successive symbol periods;

channel state indication determining means coupled to the input for determining a channel state indication for at least a plurality of the carriers for a determination period of a single symbol period or a part thereof, wherein the channel state indication determining means comprises an accumulator which is reset at least once per symbol;

averaging means coupled to the channel state indication determining means for averaging the channel state indications obtained by the channel state indication determining means for successive symbol periods to provide a succession of averaged channel state indications; and comparison means coupled to the channel state indication determining means and to the averaging means for comparing the successive channel state indications with the output of the averaging means.

2. Apparatus according to claim 1, in which the channel state indication determining means determines successive channel state indications for successive determination periods in respective successive symbol periods.

3. Apparatus according to claim 1, in which the averaging means forms a decaying average.

4. Apparatus according to claim 1, in which the averaging means forms a running average.

5. Apparatus according to claim 1, further comprising soft-decision quantising means coupled to the input for comparing the received many-carrier signal with a plurality of discrimination levels to determine at any moment the values from a plurality of possible values which are nearest to the values indicated by the received signal and for providing confidence values related thereto.

6. Apparatus according to claim 5, in which the determination of the confidence values is adjustable in response to a control signal, and further comprising control means for forming the control signal from at least in part the output of the averaging means.

7. Apparatus according to claim 5, further comprising a Viterbi decoder coupled to the output of the soft-decision quantising means.

8. Apparatus according to claim 7, further comprising a deinterleaver coupled between the output of the soft-decision quantising means and the Viterbi decoder, the deinterleaver including a symbol deinterleaving stage; and in which the symbol deinterleaving stage in the deinterleaver comprises a memory for storing a plurality of symbols, and means for deinterleaving the contents of the memory such that the deinterleaving is effected over a block of size greater than one symbol.

9. Apparatus according to claim 1 wherein the channel state indication determining means further comprises logarithm means.

10. Apparatus according to claim 9, further comprising a multiplier coupled between the output of the logarithm means and the inputs of the averaging means and the comparison means.

11. Apparatus for determining channel state information from a many-carrier signal received over a channel, the apparatus comprising:

an input for receiving a received many-carrier signal, the received many-carrier signal comprising many data carriers representing a sequence of data values in successive symbol periods;

channel state indication determining means coupled to the input for determining a channel state indication for at least a plurality of the carriers for a determination period of a single symbol period or a part thereof;

averaging means coupled to the channel state indication determining means for averaging the channel state indications obtained by the channel state indication determining means for successive symbol periods to provide a succession of averaged channel state indications;

comparison means coupled to the channel state indication determining means and to the averaging means for comparing the successive channel state indications with the output of the averaging means; and a Reed-Solomon decoder coupled to the input, the Reed-Solomon decoder further having an erasures input and providing for erasures decoding, and coupling means coupled between the averaging means and the erasures input of the Reed-Solomon decoder for providing an erasures signal derived from the output of the averaging means.

12. Apparatus according to claim 11, in which the coupling means comprises a slicer for providing two output conditions indicative of 'normal' or 'erased' respectively.

13. Apparatus according to claim 11, further comprising a deinterleaver coupled between the input and the Reed-Solomon decoder, and in which the erasures signal passes through the deinterleaver.

14. Apparatus according to claim 1, in which the channel state indication determination means comprises:

quantising means for determining at any moment the values from a plurality of possible values which are nearest to each of the points represented by each carrier in each symbol period; and differencing means for determining the modulus of the differences between the values represented by each carrier in each symbol period and the corresponding nearest values of the plurality of possible values.

15. Apparatus according to claim 14, in which the said values are phase/amplitude points.

16. Apparatus according to claim 1, in which the input is coupled to the output of an OFDM decoder in series with a channel equaliser.

17. Apparatus for determining channel state information from a many-carrier signal received over a channel, the apparatus comprising:

an input for receiving a received many-carrier signal, the received many-carrier signal comprising many data carriers representing a sequence of data values in successive symbol periods;

a channel state indication determinator coupled to the input for determining a channel state indication for a plurality of the carriers for a determination period of a single symbol period or a part thereof, wherein the channel state indication determinator comprises an accumulator which is reset at least once per symbol period;

an averager coupled to the channel state indication determinator for averaging the channel state indications obtained by the channel state indication determinator for successive symbol periods to provide a succession of averaged channel state indications;

a comparator coupled to the channel state indication determinator and to the averager for comparing the successive channel state indications from the channel state indication determinator with the output of the averager, to provide an output indicative of impulsive interference in the received many-carrier signal.

18. Apparatus for determining channel state information from a many-carrier signal received over a channel, the apparatus comprising:

an input for receiving a received many-carrier signal, the received many-carrier signal comprising many data carriers representing a sequence of data values in successive symbol periods;

a channel state indication determinator coupled to the input for determining a channel state indication for a plurality of the carriers for a determination period of a single symbol period or a part thereof;

an averager coupled to the channel state indication determinator for averaging the channel state indications obtained by the channel state indication determinator for successive symbol periods to provide a succession of averaged channel state indications;

a comparator coupled to the channel state indications determinator and to the averager for comparing the successive channel state indications from the channel state indication determinator with the output of the averager, to provide an output indicative of impulsive interference in the received many-carrier signal; and a soft-decision quantiser coupled to the input for comparing the received many-carrier signal with a plurality of discrimination levels to determine at any moment the values from a plurality of possible values which are nearest to the values indicated by the received signal and for providing confidence values related thereto, the determination of the confidence values being adjustable in response to a control signal; and the control signal being provided in dependence at least in part upon the output of the comparator.

19. Apparatus as claimed in claim 17, further comprising:

a deinterleaver coupled to the input, the deinterleaver including a symbol deinterleaving stage; and a Viterbi decoder coupled to the output of the deinterleaver;

in which the symbol deinterleaving stage in the deinterleaver comprises a memory for storing a plurality of symbols, the symbol deinterleaving stage being operative to deinterleave the contents of the memory such that the deinterleaving is effected over a block size greater than one symbol.

20. A method of determining channel state information from a many-carrier signal received over a channel, the method comprising the steps of:

receiving a many-carrier signal comprising many data carriers representing a sequence of data values in successive symbol periods;

determining a channel state indication for at least a plurality of the carriers for a determination period of a single symbol period or a part thereof, including accumulating the channel state indication in an accumulator and resetting the accumulator at least once per symbol period;

averaging the channel state indications for successive symbol periods to provide a succession of averaged channel state indications; and comparing the successive channel state indications with the averaged channel state indications to provide an output indicative of impulsive interference in the received many carrier signal.

21. A method of determining channel state information from a many-carrier signal received over a channel, the method comprising the steps of:

receiving a many-carrier signal comprising many data carriers representing a sequence of data values in successive symbol periods;

determining a channel state indication for at least a plurality of the carriers for a determination period of a single symbol period or a part thereof;

averaging the channel state indications for successive symbol periods to provide a succession of averaged channel state indications;

comparing the successive channel state indications with the averaged channel state indications to provide an output indicative of impulsive interference in the received many-carrier signal; and comparing the received many-carrier signal with a plurality of discrimination levels to determine at any moment the values from a plurality of possible nearest values which are nearest to the values indicated by the received signal and for providing confidence values related thereto, the determination of the confidence values being adjustable in response to a control signal, and the control signal being provided in dependence at least in part upon the result of the comparing of the received many-carrier signal.

22. A method according to claim 21, further comprising the steps of deinterleaving the nearest values and associated confidence values, the deinterleaving step including at least a symbol deinterleaving step, and applying the resultant to a Viterbi decoder, in which the symbol deinterleaving step comprises storing a plurality of symbols such that the deinterlearing is effected over a block size greater than one symbol.

23. Apparatus for determining values encoded by a received signal, comprising:
an input for receiving a received many-carrier signal, the received many-carrier signal comprising many data carriers representing a sequence of values in successive symbol periods;
a soft-decision quantiser coupled to the input for comparing the received many-carrier signal with a plurality of discrimination levels to determine at any moment those nearest values from a plurality of possible values which are nearest to the values indicated by the received signal and for providing confidence values relating thereto;
a Viterbi decoder coupled to the output of the soft-decision quantising and providing a signal output and an erasures output; and
a Reed-Solomon decoder coupled to the signal output of the Viterbi decoder, the Reed-Solomon decoder further providing for erasures decoding, and having an erasures input coupled to the erasures output of the Viterbi decoder.

24. Apparatus according to claim 23 in which the control output of the Viterbi decoder is dependent upon a measure of error rate over values encoding a small number of bytes.

25. Apparatus according to claim 23, wherein the Viterbi decoder comprises:
a Viterbi decoding engine for providing decoded data;
a convolutional coder coupled to the output of the Viterbi decoding engine to recode the decoded values;
comparison means coupled to receive the input to the Viterbi decoder and the output of the convolutional coder and to compare them to determine errors;
an error rate counter coupled to the output of the comparison means to determine the errors over the values encoding the said small number of bytes.

26. Apparatus according to claim 23, further comprising a deinterleaver coupled between the output of the Viterbi decoder and the Reed-Solomon decoder, the deinterleaver comprising a symbol deinterleaving stage which comprises a memory for storing a plurality of symbols, and means for deinterleaving the contents of the memory such that the deinterleaving is effected over a block of size greater than one symbol.

27. Apparatus according to claim 23, further comprising channel state indication determining means coupled to the input for determining a composite channel state indication for the carriers for each symbol period or a part thereof, and combining means for combining the erasures output of the Viterbi decoder and a signal derived from the composite channel state indication and for applying the resultant of the combination to the erasures input of the Reed-Solomon decoder.

28. Apparatus according to claim 23, further comprising channel state indication determining means coupled to the input for determining a composite channel state indication for the carriers for each symbol period or a part thereof, and selection means for selecting either the erasures output of the Viterbi decoder or a signal derived from the composite channel state indication for application to the erasures input of the Reed-Solomon decoder.

29. Apparatus for determining values encoded by a received signal, comprising:
an input for receiving a sequence of values encoding bytes of digital data;
a soft-decision quantiser coupled to the input for comparing the received values with a plurality of discrimination levels to determine at any moment those nearest values from a plurality of possible values which are nearest to the received values and for providing confidence values relating thereto; and
a Viterbi decoder coupled to the output of the soft-decision quantiser and providing a signal output and a control output, the control output being dependent upon a measurement of error rate over values encoding a small plurality of bytes.

30. Apparatus according to claim 29, wherein the small plurality is in the range 2 to 9.

31. Apparatus according to claim 29, wherein the measure of error rate is an estimate of the bit error rate (BER).

32. Apparatus according to claim 29, wherein the Viterbi decoder comprises means for deriving the said measure of error rate.

33. Apparatus according to claim 29, wherein the Viterbi decoder comprises:
a Viterbi decoding engine for providing decoded data;
a convolutional coder coupled to the output of the Viterbi decoding engine to recode the decoded values;
comparison means coupled to receive the input to the Viterbi decoder and the output of the convolutional coder and to compare them to determine errors;
an error rate counter coupled to the output of the comparison means to determine the errors over the values encoding the said small number of bytes.

34. Apparatus according to claim 33, wherein the values are encoded using a punctured code, and the measure of error rate is not made for punctured bits.

35. Apparatus according to claim 29, further comprising a Reed-Salomon decoder coupled to the output of the Viterbi decoder for decoding values from the received values, the Reed-Solomon decoder having an erasures input providing for erasures decoding.

36. Apparatus according to claim 35, in which the control output of the Viterbi decoder is coupled to the erasures input of the Reed-Solomon decoder.

37. Apparatus according to claim 35, further comprising channel state indication determining means coupled to the input for determining a composite channel state indication for each of a plurality of successive symbol periods or a part thereof, and in which the output of the channel state indication determining means is coupled to the erasures input of the Reed-Solomon decoder.

38. Apparatus according to claim 35, further comprising a deinterleaver coupled between the output of the Viterbi decoder and the Reed-Solomon decoder, the deinterleaver comprising a symbol deinterleaving stage which comprises a memory for storing a plurality of symbols, and means for deinterleaving the contents of the memory such that the deinterleaving is effected over a block of size greater than one symbol.

39. A method of determining values encoded by a received signal, the method comprising the steps of:
  receiving a sequence of values which encode bytes of digital data;
  comparing the received values with a plurality of discrimination levels to determine at any moment those nearest values from a plurality of possible values which are nearest to the received values and for providing confidence values relating thereto; and
  applying the said nearest values and confidence values to a Viterbi decoder, the Viterbi decoder providing a signal output and a control output, and in which the control output is dependent upon a measure of error rate over values encoding a small plurality of bytes.

40. Apparatus for determining values encoded by a received signal, comprising:
  an input for receiving a received many-carrier signal, the received many-carrier signal comprising many data carriers representing a sequence of values in successive symbol periods;
  a Reed-Solomon decoder coupled to the input for decoding values from the received many-carrier signal, the Reed-Solomon decoder having an erasures input and providing for erasures decoding;
  channel state indication determining means coupled to the input for determining a composite channel state indication for the carriers for each symbol period or a part thereof; and
  coupling means coupling the output of the channel state indication determining means and the erasures input of the Reed-Solomon decoder for providing to the Reed-Solomon decoder an erasures signal derived from the channel state indication determining means.

41. Apparatus according to claim 40, in which the coupling means comprises a slicer for providing two output conditions indicative of 'normal' or 'erased' respectively.

42. Apparatus according to claim 40, further comprising a deinterleaver coupled between the input and the Reed-Solomon decoder, and in which the erasures signal passes through the deinterleaver.

43. A method of determining values encoded by a received signal, the method comprising the steps of:
  providing a Reed-Solomon decoder having a signal input and an erasures input, and providing for erasures decoding;
  receiving a received many-carrier signal comprising many data carriers representing a sequence of values in successive symbol periods;
  applying a signal described from the received signal to the Reed-Solomon decoder to decode values from the received signal;
  determining from the received signal a composite channel state indication for the carriers for each symbol period or a part thereof; and
  applying a signal derived from the composite channel state indication to the erasures input of the Reed-Solomon decoder.

44. Apparatus according to claim 6, further comprising second channel state indication determining means for determining a carrier-by-carrier measure of channel state indication averaged over a plurality of symbols, and in which the control means forms the control signal from the output of the averaging means and the output of the second channel state indication determining means.

* * * * *